United States Patent
Hufschmied

(10) Patent No.: US 9,452,479 B2
(45) Date of Patent: Sep. 27, 2016

(54) MACHINING TOOL FOR MACHINING AND METHOD FOR CUTTING A COMPONENT MADE OF FIBER-REINFORCED PLASTICS

(71) Applicant: Hufschmied Zerspanungssysteme GmbH, Bobingen (DE)

(72) Inventor: Ralph Hufschmied, Bobingen (DE)

(73) Assignee: Hufschmied Zerspanungssysteme GmbH, Bobingen (DE)

( * ) Notice: Subject to any disclaimer, the term of this patent is extended or adjusted under 35 U.S.C. 154(b) by 0 days.

(21) Appl. No.: 14/683,979

(22) Filed: Apr. 10, 2015

(65) Prior Publication Data

US 2015/0209876 A1 Jul. 30, 2015

Related U.S. Application Data

(63) Continuation of application No. PCT/EP2013/002913, filed on Sep. 27, 2013.

(30) Foreign Application Priority Data

Oct. 10, 2012 (DE) ........................ 10 2012 019 799

(51) Int. Cl.
B23C 5/10 (2006.01)

(52) U.S. Cl.
CPC ......... *B23C 5/10* (2013.01); *B23C 2210/0414* (2013.01); *B23C 2210/0492* (2013.01);
(Continued)

(58) Field of Classification Search
CPC .............. B23C 2210/0414; B23C 2210/0492; B23C 2210/126; B23C 2210/282; B23C 2210/285; B23C 2210/40; B23C 2210/048; B23C 2220/305; B23C 2226/27; B23C 5/105; Y10T 407/1948; Y10T 409/303752

USPC ............................................ 407/53–64, 120
See application file for complete search history.

(56) References Cited

U.S. PATENT DOCUMENTS 1,948,057 A * 2/1934 Tscherne ................... B23C 5/04
407/59
2,782,490 A * 2/1957 Graves ...................... B23C 5/04
407/120
(Continued)

FOREIGN PATENT DOCUMENTS

DE 8609688.5 10/1986
DE 3742942 12/1988
(Continued)

OTHER PUBLICATIONS

International Search Report and Written Opinion in counterpart International Application No. PCT/EP2013/002913, mailed on Jan. 22, 2014.

*Primary Examiner* — Daniel Howell
*Assistant Examiner* — Nicole N Ramos
(74) *Attorney, Agent, or Firm* — Walter Ottesen, P.A.

(57) ABSTRACT

A face cutter for machining fiber-reinforced materials such as carbon-fiber-reinforced plastics, glass-fiber-reinforced plastics or plastics reinforced with polyester threads is provided which includes main flutes which form with trailing premachining lands cutting wedges with premachining cutting edges, and auxiliary flutes, the number of which corresponds to a number of the main flutes, each trail one of the main flutes in the peripheral sense, each distance in the peripheral sense a postmachining land from the premachining land leading in the peripheral sense, and form with the postmachining land a cutting wedge with a postmachining cutting edge. The premachining cutting edges extend alternately with right-hand twist about and untwisted along the tool axis, the postmachining cutting edges trailing the right-hand twisted premachining cutting edges extend untwisted along the tool axis, and the postmachining cutting edges trailing the untwisted premachining cutting edges extend with a right-hand twist about the tool axis.

13 Claims, 4 Drawing Sheets

(52) U.S. Cl.
CPC .... *B23C2210/126* (2013.01); *B23C 2210/282* (2013.01); *B23C 2210/285* (2013.01); *B23C 2210/40* (2013.01); *B23C 2220/605* (2013.01); *B23C 2226/27* (2013.01); *Y10T 407/1948* (2015.01); *Y10T 409/303752* (2015.01)

(56) References Cited

U.S. PATENT DOCUMENTS

| | | | |
|---|---|---|---|
| 3,456,316 A * | 7/1969 | Dawson | B23C 5/10 407/53 |
| 4,285,618 A | 8/1981 | Shanley, Jr. | |
| 6,164,876 A | 12/2000 | Cordovano | |
| 7,367,754 B1 * | 5/2008 | Greenwood | B23C 5/10 407/59 |
| 2004/0120777 A1 | 6/2004 | Noland | |
| 2007/0248422 A1 * | 10/2007 | Song | B23C 5/10 407/54 |
| 2010/0196108 A1 | 8/2010 | Oka et al. | |
| 2013/0017025 A1 * | 1/2013 | Azegami | B23C 5/10 407/54 |

FOREIGN PATENT DOCUMENTS

| | | | |
|---|---|---|---|
| DE | 20209768 | 1/2004 | |
| DE | 20211589 | 3/2004 | |
| DE | 20211592 | 5/2004 | |
| DE | 20304580 | 9/2004 | |
| DE | 102007034087 A1 * | 1/2009 | ............... B23C 5/08 |
| DE | 112009000013 T5 | 9/2010 | |
| EP | 2554309 | 2/2013 | |
| JP | 07299634 A * | 11/1995 | |
| JP | 2006198767 A * | 8/2006 | |
| JP | 2010234462 | 10/2010 | |

* cited by examiner

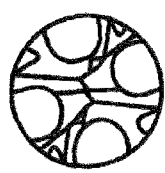
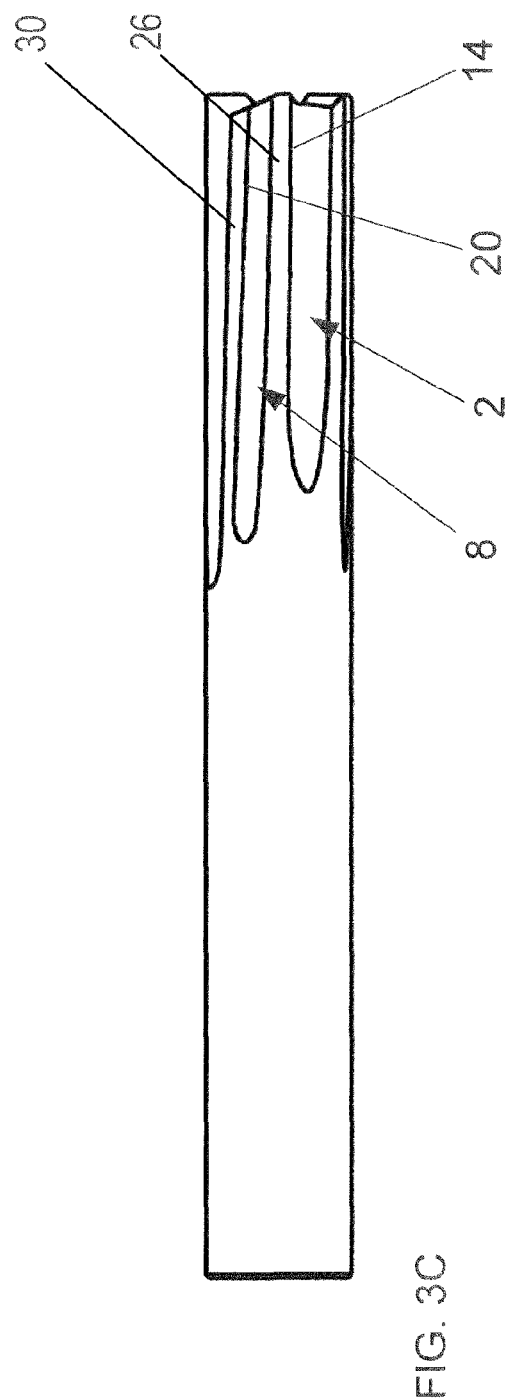
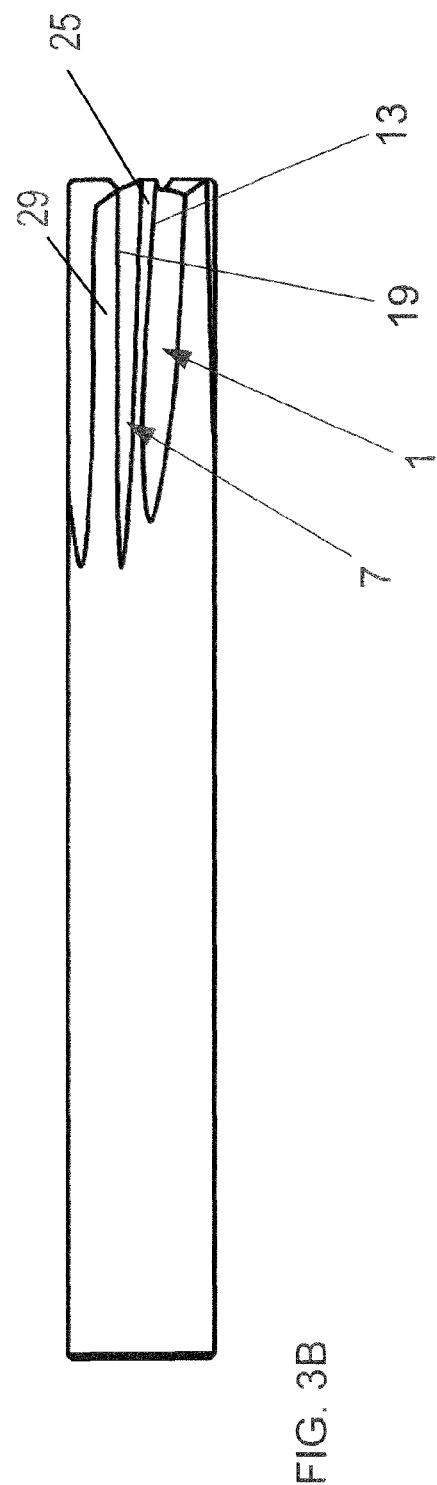
FIG. 3A
FIG. 3B
FIG. 3C

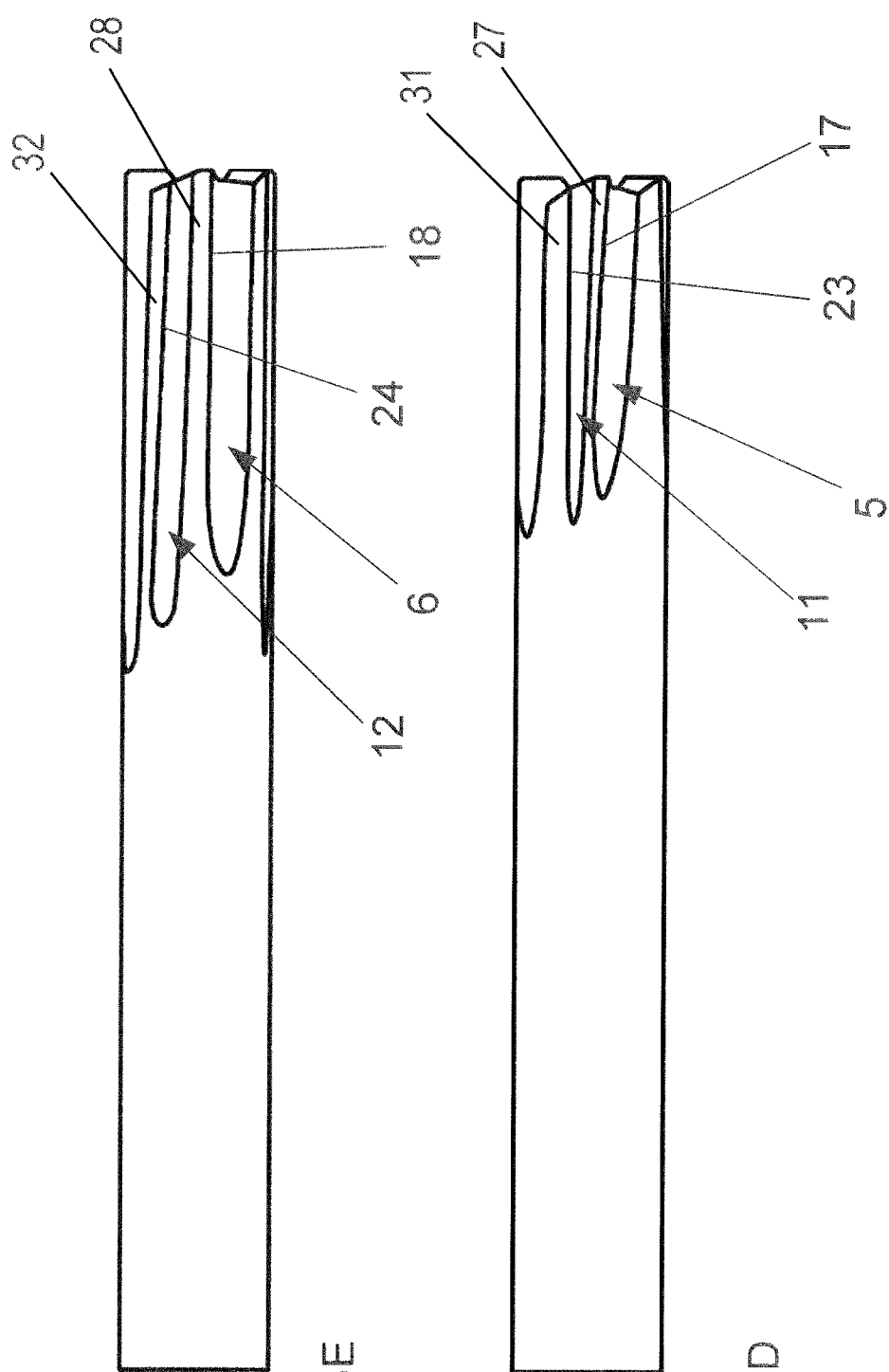

MACHINING TOOL FOR MACHINING AND METHOD FOR CUTTING A COMPONENT MADE OF FIBER-REINFORCED PLASTICS

CROSS REFERENCE TO RELATED APPLICATIONS

This application is a continuation of International Application No. PCT/EP2013/002913, filed on Sep. 27, 2013, which claims priority under 35 U.S.C. §119 to Application No. DE 10 2012 019 799.3 filed on Oct. 10, 2012, the entire contents of which are hereby incorporated by reference.

FIELD OF THE INVENTION

The invention relates to a machining tool for machining fiber reinforced materials and a method for cutting or separating thin plates of fiber reinforced plastic.

BACKGROUND

Machining tools of the generic type and especially end milling cutters for machining of fiber-reinforced materials (fiber composites) as carbon-fiber-reinforced plastic (CFRP), glass-fiber reinforced plastic (GFRP) or plastics reinforced with polyester threads have a plurality of main flutes circumferentially spacing a corresponding plurality of premachining lands and forming with each trailing premachining land a cutting wedge with a premachining cutting edge, and a plurality of auxiliary flutes corresponding to the plurality of main flutes, each auxiliary flute trailing a respective one of the main flutes, wherein each auxiliary flute circumferentially spaces a postmachining land of the premachining land leading in the circumferential direction and forms with the postmachining land a cutting wedge with a postmachining cutting edge.

This corresponds to finishing-roughing-cutters which are well-known from the metalworking and which are described, for example, in German Patent DE 3742942 C1, German utility model DE 8609688 U1 or U.S. Pat. No. 4,285,618 B, in which each roughing cutting edge is associated with a trailing finishing cutting edge.

In addition it is known from metalworking that to be able to accomplish in a single operation both the rough machining, i.e. a roughing work step, as well as the finish machining, i.e. a post-reaming or finishing work step, and thereby to come to a good surface quality within less processing time, in the milling and drilling of fiber-reinforced materials an additional problem should be resolved. A tearing out of individual fibers or a splicing of the thread is quite common when a workpiece from such a material is machined with conventional machining tools. Individual fibers are thus torn from the edge of the processing site, others are pressed during passage of the tool to the edge of the processing site, so that they are cut only on an end protruding over the edge of the machining point and therefore after processing protrude over the edge. By finishing, a cutting of the protruding fiber ends should be carried out, while at the same time a design of premachining cutting edges doing the main cutting work should be allowed, which is relatively blunt and doesn't tend much to a tearing out of individual fibers.

For example, German utility model DE 202 09 768 U shows a step drill for machining of sandwich materials, on which the main cutting edges at the step are offset to one another such that the one main cutting edge makes a pre-cutting and the other one a post-reaming. German utility model DE 202 11589 U1 shows another drill for machining sandwich material workpieces, wherein two premachining lands are more or less blunt designed as broaching tools and the postmachining lands trailing in the circumferential direction with sharp cutting edges as reaming tools. Similar drills are shown in the utility models DE 202 11592 U and DE 203 04580 U1, wherein broad circular grinding chamfers respectively grinding heels are used for reinforcement of the drilling hole and rounded cutting corners are used to prevent tearing of the thread.

At the tool shown in Japanese Document JP 2010-234462 A, left-hand twisted blades alternate with untwisted blades. European patent application EP 2554309 A1 shows a tool with on the one hand rectilinear cutting edges and on the other hand right-hand twisted cutting edges, which tool is intended for machining of materials such as carbon fiber reinforced plastic.

An end milling cutter for machining of fiber reinforced plastics is shown in German Patent DE 11 2009 000 013 B4, in which the idea of a separation of functions in main cutting work done by leading premachining lands and only postprocessing work done by trailing postmachining lands has also been implemented. The leading premachining lands have a left-hand twist and the trailing postmachining lands have a right-hand twist to prevent burrs.

SUMMARY

The inventive concept is based on the idea of a separation of functions in leading roughing lands and trailing finishing lands of machining tools for machining fiber-reinforced materials. It is an object of the invention to further develop an end milling cutter for machining fiber-reinforced materials, such that even better surface qualities can be achieved. In particular, a tool for cutting or separating thin plates or boards made of fiber-reinforced materials is provided and a method for separating thin plates or boards of fiber-reinforced materials is improved.

The machining tool according to an aspect of the invention is characterized on the one hand by the fact that the premachining cutting edges alternately extend with right-hand twist around, and untwisted or at least almost untwisted along the tool axis. On the other hand, it is characterized by the fact that the postmachining cutting edges trailing the right-hand twisted premachining cutting edges extend untwisted or at least almost untwisted along the tool axis and that the postmachining cutting edges trailing the untwisted or at least substantially untwisted premachining cutting edges extend with a right-hand twist around the tool axis.

Thus, in a known manner, a segregation into a rough machining, i.e. a roughing and a fine machining, i.e. a finishing is made, wherein the different processing functions are carried out by means of differently designed cutting edges, namely the premachining cutting edges, respectively the roughing cutting edges at premachining lands and the trailing postmachining cutting edges, respectively the finishing cutting edges on postmachining lands. As is also known, each of the premachining cutting edges is trailed by one of the postmachining cutting edges. Further known is that this results in a distribution of the loads acting on the matrix of the fiber reinforced material into the impact of the leading premachining cutting edge and the impact of the trailing postmachining cutting edge, wherein the larger portion of the load is applied to the material by the leading premachining cutting edge in the premachining and the smaller portion of the load by the trailing postmachining cutting edge in the postmachining In most operational cases, cutting or machining is done with right-hand twist. This means that, for a usually clockwise rotating machining tool, in the axial direction only tensile loads are applied to the material. The inventor has determined a positive effect on the surface quality of the machined component, if the individual cutting forces acting on the processed part come from alternating load directions during cutting with the single cutting edges.

According to an aspect of the invention, it is therefore intended to let a premachining cutting edge extending with a right-hand twist around the tool axis be followed or trailed by a postmachining cutting edge not being right-hand twisted but being untwisted, which then rubs off the material just cut off with the leading right-hand twisted premachining cutting edge from the machined workpiece surface. By changing the direction of twist, the stresses occurring at the matrix of the fiber reinforced material during the impact of the two successive cutting edges come from different directions, so that a certain compensation occurs at the workpiece surface at least in the load components acting in the axial direction.

Fiber reinforced materials such as CFRP are relatively inhomogeneous, so that it may be that the material can escape the separation during an impact of the cutting edge with a certain load direction, but not if impacted with a different load direction. If now an untwisted, neutral postmachining cutting edge follows or trails a right-hand twisted premachining cutting edge, material will be caught and cut by the postmachining cutting edge, e.g. thread ends which potentially sidestepped the impact of the premachining cutting edge.

Compressive and tensile load should alternate as possible. For geometrical reasons, however, a twisting of the postmachining cutting edge is not possible in the opposite direction to the twisting of the premachining cutting edge without a crossing of a main flute and the respective trailing auxiliary flute and thus without a crossing of the premachining cutting edge and the postmachining cutting edge. Therefore, an untwisted and not a left-hand twisted course of the postmachining cutting edge trailing the right-hand twisted premachining cutting edge is provided. Instead of a completely untwisted postmachining cutting edge, also a nearly untwisted postmachining cutting edge can be provided, that is a postmachining cutting edge with a right-hand twist being small or smaller against the right-hand twist of the directly leading premachining cutting edge, wherein also a small or in absolute value smaller left-hand twist would be conceivable.

If one considers only one leading premachining cutting edge and the trailing postmachining cutting edge, a certain balance of compressive and tensile forces acting on the resin matrix of the fiber reinforced workpiece is already achieved with this. However, it is generally such that at the premachining cutting edge the main cutting work is done and only a smaller portion of the load acts on the material during passage of the postmachining cutting edge. Therefore, if all premachining cutting edges would extend with right-hand twist, a pulling preferred cutting direction would form, since the load portion that the postmachining cutting edges would apply onto the workpiece would be small relative to the load portion of the premachining cutting edges.

According to an aspect of the invention, therefore not only right-hand twisted premachining cutting edges alternate with untwisted postmachining cutting edges. Rather, the direction of the twist of each of the premachining cutting edges alternates against the next premachining cutting edge in the circumferential direction from right-hand twisted to untwisted, wherein instead of a completely untwisted premachining cutting edge also an almost untwisted premachining cutting edge can be provided, i.e. a premachining cutting edge with a right-hand twist being small or smaller in respect to the right-hand twist of the directly leading premachining cutting edge, wherein also a left-hand twist being small or in absolute value smaller would be conceivable. Then a right-hand twisted postmachining cutting edge follows on a premachining cutting edge extending untwisted or nearly untwisted along the tool axis.

With the machining tool according to an aspect of the invention, surface finishes can be achieved, which go far beyond the quality which can be expected with conventional tools with equal twisted alternating finishing and roughing cutting edges.

The tool geometry according to an aspect of the invention has proven particularly advantageous for separating plates made of fiber-reinforced plastic such as CFRP or GFRP with low thickness, for example, 3 mm or even below 1.5 mm. Because these panels are usually made up of individual layers of material being laminated together, which have a strong tendency to vibrate, which has repeatedly led to material injury, if at these plates cuts were made with conventional finishing-roughing-cutters for CFRP processing. By alternating the twist of the cutting edges, a calming of the vibration occurs and thus it comes to a much cleaner separating cut.

Suitable values for the twist angle of the untwisted or nearly untwisted premachining cutting edges and postmachining cutting edges are in a range from −2 to 2°, wherein these premachining cutting edges and postmachining cutting edges extend preferably completely untwisted with a 0° twist angle. Suitable values for the twist angle of the right-hand twisted cutting edges are in a range of 4° to 10°, in particular 6° to 10°, and preferable a twist angle of 8°. The twist angle is the angle of the projection of the cutting edge into a plane passing through the tool axis relative to the tool axis, wherein a left-hand twist is indicated by a negative value and a right-hand twist by a positive value. When the tool is driven in clockwise or right turning direction, the right-hand twisted flute is first at the tool tip at the point of impact or engagement, whereas last with left-hand twist.

Advantageously, the rake angle at all postmachining cutting edges is greater than the rake angle at the respective leading premachining cutting edge, i.e., the finishing cutting edges serving as postmachining cutting edges are sharper than the respective leading premachining cutting edges. Also advantageously, all postmachining cutting edges are sharper than any of the premachining cutting edges. A negative rake angle at all or at least at a part of the premachining cutting edges would be conceivable. That is, the premachining cutting edges may be formed as relatively blunt broaches.

It is particularly advantageous if the rake angle is different at all premachining cutting edges. It is also particularly advantageous if the rake angle is also different at all postmachining cutting edges. This is based on the finding that fiber-reinforced plastics are relatively inhomogeneous materials that have a non-homogeneously distributed hardness, that is, they can be in locally close succession once relatively hard, once relatively soft. In addition to the alternation of the twist of the cutting edges, it is attempted to replicate this inhomogeneity on the tool through the different rake angles. With correspondingly high speeds, the hope exists to pass the machined position at least once with the right rake angle.

It is furthermore advantageous if the premachining cutting edges each merge into a clearance surface without circular grinding chamfer, so that a rubbing of the separated material into the machined surface is largely avoided. Analogously, it is also preferred at the postmachining lands, if there the postmachining cutting edges merge directly into a clearance surface without circular grinding chamfer.

As with the advantageous differently selected rake angles, it is advantageous if the clearance angle is different at all premachining lands, to cope with the inhomogeneity of the processed material. For this purpose, it is also advantageous if the clearance angle at all postmachining cutting edge is different as well.

To this effect, it might even be possible to choose different twist or helix angles for the preferably at least two right-hand twisted premachining cutting edges, as well as to choose different twist angles for the preferably also at least two non-twisted or almost untwisted premachining cutting edges. The same applies to the postmachining cutting edges.

Because example embodiments of the machining tool include an end milling cutter with four premachining cutting edges, in individual cases and especially with larger tool diameters six premachining cutting edges, that is two or three right-hand twisted and two or three untwisted or almost untwisted premachining cutting edges, have been shown in tests to be particularly promising. Furthermore, an equidistant distribution of the premachining cutting edges over the circumference, being already usual in terms of a simple tool geometry, has also proven to be advantageous for the further development of the tool according to the invention.

Since the main machining or cutting work is done at the premachining lands and hence the material removal is done mainly by the main flutes, it has also proven of value, when the phase angle from a cutting corner at each leading premachining cutting edge to a cutting corner at the respective trailing postmachining cutting edge is smaller than the phase angle form the cutting corner of each trailing postmachining cutting edge to the cutting corner on the respective trailing premachining cutting edge.

It would be within the meaning of the compensation for material inhomogeneity quite conceivable to provide the postmachining cutting edges each with different angular spacing to the respective leading premachining cutting edge, as long as this angular distance is less than that to the next trailing premachining cutting edge. It is to the effect of a simple tool geometry however, if the postmachining cutting edges are distributed equidistantly over the circumference.

On a tool with four premachining cutting edges and postmachining cutting edges, in experiments values of about 20°-35° have proven to be suitable at all postmachining cutting edges for the phase angle of the cutting corner of the leading premachining cutting edge to the cutting corner on the respective trailing postmachining cutting edge, on a tool having six premachining cutting edges values of 15°-25°.

Furthermore, it has proven advantageous if the cutting corners are at least slightly rounded at the premachining cutting edges, preferably with a radius of 0.05 mm-0.5 mm, especially 0.1 mm-0.5 mm, and thus a sharp cutting corner or a chamfer with two cutting edges is avoided. Because they tend to hook into the material to be machined and to draw threads or fibers out of the machined surface (delamination).

It is also advantageous in terms of a simple tool geometry while avoiding crossed cutting edges, if the cutting length of the pre- and postmachining cutting edges has a value of no more than 2 times the tool diameter.

It has been shown that for the rise of the rake angle of the premachining cutting edges, starting from a premachining cutting edge with the smallest rake angle up to a premachining cutting edge with the largest rake angle, steps of 3°-5° deliver the best results in terms of a smooth surface. At a promising experimental tool with four pre- and postmachining cutting edges, the rake angles were 5°, 8°, 11°, 14° at the four premachining cutting edges. It is assumed that the rise is preferably increasing around the circumference until again the premachining cutting edge with the smallest rake angle follows on the premachining cutting edge with the largest rake angle.

It has also been shown that for the rise of the clearance angle from a premachining land with the smallest clearance angle up to a premachining land with the largest open-angle steps of 3°-5° deliver the best results in terms of a smooth surface. At a promising experimental tool with four pre- and postmachining cutting edges, the clearance angles were 12°, 17°, 22°, 27° at the four premachining lands.

It is assumed that there is a combinatorial effect of the clearance angle increase and the rake angle increase at the premachining lands. That is, the smallest clearance angle is preferably provided on the premachining land with the premachining cutting edge with the smallest rake angle and the clearance angle increases at the individual premachining lands together with the local rake angle. At the promising experimental mentioned above, for example, a clearance angle of 12° was provided on the premachining cutting edge with 5° rake angle, a clearance angle of 17° at the premachining cutting edge with 8° rake angle, a clearance angle of 22° at the premachining cutting edge with 11° rake angle, and a clearance angle of 27° at the premachining cutting edge with 14° rake angle.

Also for the increase in rake angle at the postmachining lands, steps of 3°-5° proved to be suitable, for example, in a tool with four pre- and postmachining cutting edges 10°, 14°, 18°, 22°. Unlike the concurrent combinatorial effect of the clearance angle increase and the rake angle increases at the premachining lands, it is however advantageous if the rake angle increase at the postmachining cutting edges runs reciprocal to rake angle increase at the premachining cutting edges. That is, the rake angle is preferably the greatest at that postmachining cutting edge, which trails the premachining cutting edge with the smallest rake angle, and that the rake angle falls with the increasing in rake angle at the respective leading premachining cutting edge, until the rake angle at those postmachining cutting edge is the smallest, which trails the premachining cutting edge with the largest rake angle. Thus, the total cutting force resulting from the individual cutting forces occurring at a premachining cutting edge and the trailing postmachining cutting edge can be held for all pre- and postmachining cutting edge pairs of the machining tool on a level as even as possible.

Therefore, the clearance angle is preferably the greatest on that postmachining cutting edge, which trails that premachining cutting edge with the smallest clearance angle, and falls with the increasing in rake angle at the respective leading premachining cutting edge until the clearance angle at that postmachining cutting edge is the smallest, which trails the premachining cutting edge with the largest rake angle. Here, steps of 3°-5° have proven to be beneficial for the increase in clearance angle or relief angle at the postmachining lands, too.

When repairing a damaged component of fiber reinforced plastic such as CFRP, a so-called scarf-joint or scarf mounting is frequently used, in particular to patch torn holes or the like. To this end, terraced arranged steps are generated for example around the torn hole in a very fine resolution, e.g. in a resolution of 0.1 mm-0.5 mm in height and width.

Previously, one was limited to the use of laser or water jet. With the use of lasers, however, severe damage can be caused very easy to the resin matrix of the component to be repaired. By contrast, with the use of water jet it takes too long to be used economically.

With the end milling cutter according to the invention, for the first time the terraced-shaped stair steps necessary for repairing a damaged component of fiber reinforced plastic such as CFRP shafts by scarf mounting can be produced by milling in a resolution of 0.1 mm-0.5 mm in height and width, as needed for scarf mounting and with a surface smoothness as required for the subsequent bonding.

Therefore, a method is provided in which for repair purposes terraced arranged steps are produced by milling on a component of fiber reinforced plastic such as CFRP, for example around a torn hole in the component in a very fine resolution, for example in a resolution of 0.1 mm-0.5 mm in height and width, in particular with the inventive milling tool or with a milling tool further developed according to the present application, wherein the component is subsequently bonded with a patch or with a three-dimensional structure which is complementary to the terraced running stair steps.

BRIEF DESCRIPTION OF THE DRAWINGS

Example embodiments will now be described with reference to the accompanying drawing.

FIG. 3A is a down scaled schematic top view of the tool tip shown in FIG. 2 according to the second example embodiment of the invention;

FIG. 3B is a first schematic side view of the end milling cutter according to the second example embodiment of the invention;

FIG. 3C is a second schematic side view of the end milling cutter according to the second example embodiment of the invention;

FIG. 3D is a third schematic side view of the end milling cutter according to the second example embodiment of the invention;

FIG. 3E is a fourth schematic side view of the end milling cutter according to the second example embodiment of the invention.

DETAILED DESCRIPTION

Figure 1:
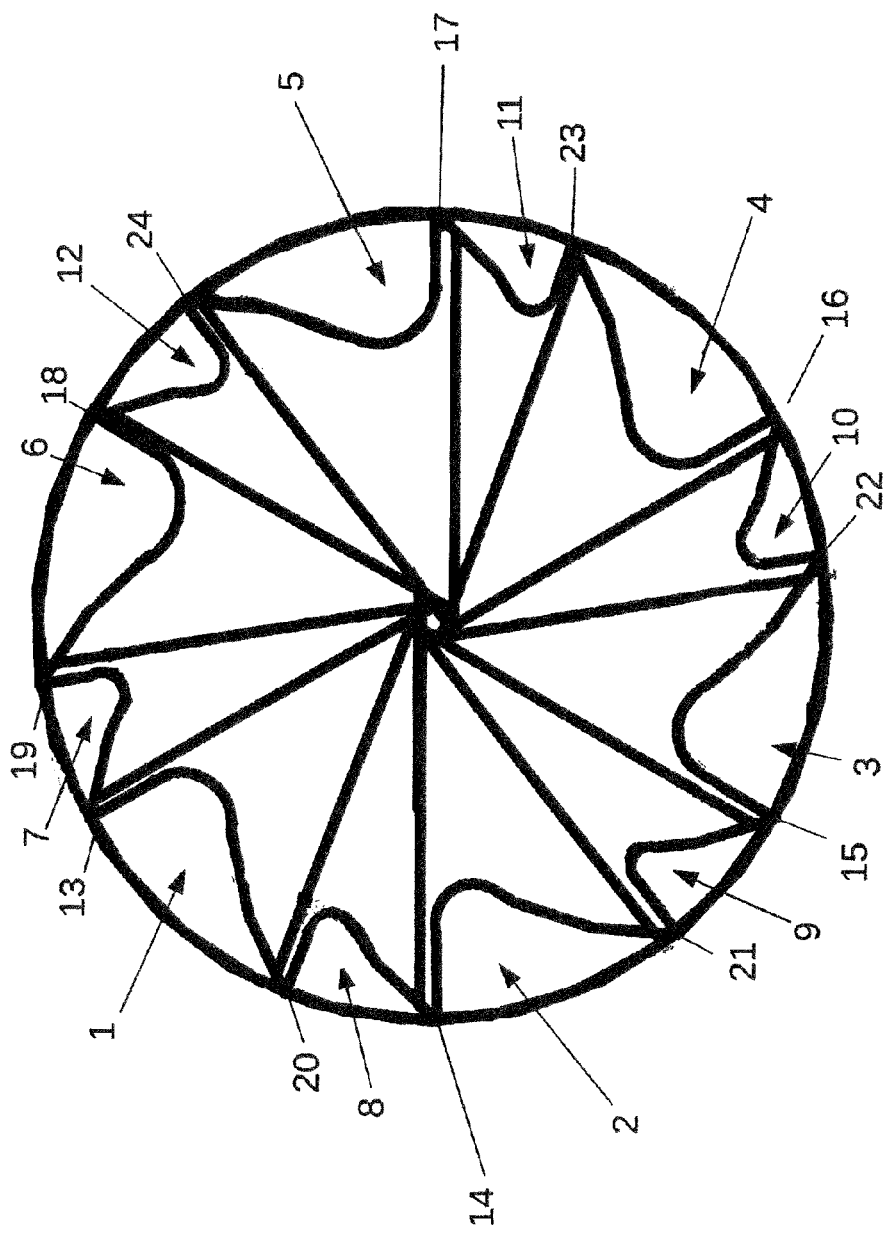
FIG. 1 is a schematic top view of a tool tip of an end milling cutter having six main flutes and six auxiliary flutes according to a first example embodiment of the invention.
Figure 2:
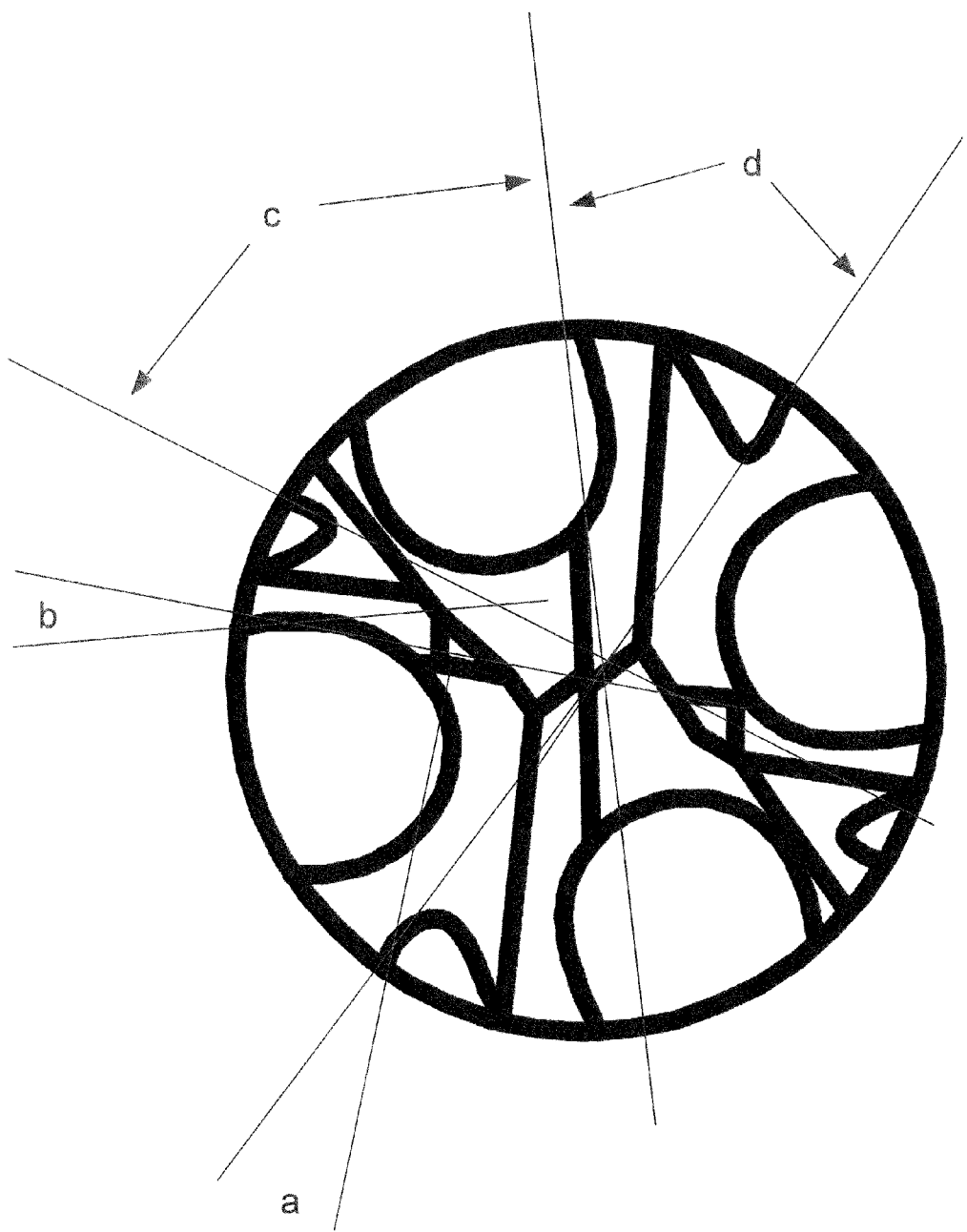
FIG. 2 is a schematic top view of a tool tip of an end milling cutter having four main flutes and four auxiliary flutes according to a second example embodiment of the invention.

According to a first example embodiment of the invention shown in FIG. 1, the end milling cutter includes 6 main flutes 1, 2, 3, 4, 5, and 6 which form, together with a respective trailing premachining land extending along the tool axis, a cutting wedge with a premachining cutting edge 13, 14, 15, 16, 17, and 18. According to the first example embodiment, six auxiliary flutes 7, 8, 9, 10, 11, and 12 are provided, which are arranged in a circumferential direction between two of the main flutes 1, 2, 3, 4, 5, and 6, respectively. Thus, each of the auxiliary flutes circumferentially trails one of the main flutes. Each auxiliary flute 7, 8, 9, 10, 11, and 12 spaces a postmachining land apart from the leading premachining land in the circumferential direction. With each of the postmachining lands 9, 10, 11, and 12, a respective auxiliary flute 7, 8, 9, 10, 11, 12 forms a cutting wedge with a postmachining cutting edge 19, 20, 21, 22, 23, and 24. FIG. 2 shows a tool tip of an end milling cutter with rake angles a and b and phase angles c and d according to the second example embodiment of the invention. The end milling cutter in FIG. 2 has four premachining cutting edges 13, 14, 17, and 18, four postmachining cutting edges 19, 20, 23, and 24, four main flutes 1, 2, 5, 6, and four auxiliary flutes 7, 8, 11, and 12. As shown in FIG. 2, rake angle a is an angle at the postmachinq cutting edges and rake angle b is an angle at the premachining cutting edges. As shown in FIG. 2, rake angle a is greater than rake angle b. FIG. 2 further shows phase angle c, which is an angle from a postmachinq cutting edge to a trailing premachining cutting edge, and phase angle d, which is angle from a premachining cutting edge to a trailing postmaching cutting edge. As shown in FIG. 2, phase angle d is smaller than phase angle c. FIG. 3A is a down scaled schematic top view of the tool tip shown in FIG. 2. FIGS. 3B to 3E are schematic side views of the end milling cutter according to the second example embodiment illustrating a 360°- turn of the end milling cutter around a tool axis in steps of 90°. As shown in FIGS. 3B to 3E, premachining lands 25, 26, 27, and 28 are lands behind the main flutes 1, 2, 5, and 6, that carry the premachining cutting edges 13, 14, 17, and 18. Postmachininq lands 29, 30, 31, and 32 are lands behind the auxiliary flutes 7, 8, 11, 12, that carry the postmachininq cutting edges 19, 20, 23, 24. As shown in FIGS. 3B and 3D, postmachininq cutting edges 19 and 23 are untwisted and premachining cutting edges 13 and 17 have a right hand twist. As shown in FIGS. 3C and 3E, postmachining cutting edges 20 and 24 have a right hand twist and premachining cutting edges 14 and 18 are untwisted.

The premachining cutting edges 13, 14, 15, 16, 17, 18 are provided alternately with right-hand twist about the tool axis and untwisted along the tool axis. That is, the premachining cutting edges 13, 15, 17 are right-hand twisted, whereas the premachining cutting edges 14, 16, 18 are untwisted.

Therein, the postmachining cutting edges 19 21, 23 directly trailing the right-hand twisted premachining cutting edges 13, 15, 17 extend untwisted along the tool axis, whereas the postmachining cutting edges 20, 22, 24 trailing the non-twisted premachining cutting edges 14, 16, 18 extend right-hand twisted around the tool axis.

Variations and modifications of the example embodiment shown are possible without departing from the scope of the invention.

What is claimed is:
1. A machining tool for machining fiber reinforced materials, the machining tool comprising:
    a plurality of at least four main flutes, each of which forms with a respective trailing premachining land a cutting wedge with a premachining cutting edge;
    a plurality of auxiliary flutes a number of which corresponds to a number of the main flutes, wherein each of the plurality of auxiliary flutes:
        trails a respective one of the plurality of main flutes,
        circumferentially spaces a postmachining land off a premachining land leading in the circumferential direction, and
        forms with the postmachining land a cutting wedge having a postmachining cutting edge,
    wherein the premachining cutting edges extend alternately on the one hand around the tool axis with a right-hand twist and on the other hand along the tool axis untwisted or at least with a twist being in absolute value smaller than the right-hand twist of the directly leading premachining cutting edge, wherein the postmachining cutting edges trailing the right-hand twisted premachining cutting edges extend untwisted along the tool axis or at least with a twist being in absolute value smaller than the right-hand twist of the directly leading premachining cutting edge, and wherein the postmachining cutting edges extend with a right-hand twist around the tool axis, which are trailing the untwisted premachining cutting edges or trailing the premachining cutting edges, which extend at least with a twist being in absolute value smaller than the right-hand twist of the directly leading premachining cutting edge.

2. The machining tool according to claim 1, wherein a rake angle at all postmachining cutting edges is greater than the rake angle at a respective leading premachining cutting edge.

3. The machining tool according to claim 2, wherein a phase angle from a cutting corner at each leading premachining cutting edge to a cutting corner at the respective trailing postmachining cutting edge is smaller than the phase angle from the cutting corner of each trailing postmachining cutting edge to the cutting corner at the respective trailing premachining cutting edge, wherein when the machining tool has four premachining cutting edges and postmachining cutting edges the phase angle at all postmachining cutting edges is 20° to 35°, and wherein when the machining tool has six premachining cutting edges and postmachining cutting edges the phase angle on all postmachining cutting edges is 15° to 25°.

4. The machining tool according to claim 3, wherein the premachining cutting edges are distributed equidistantly over the circumference, and wherein the postmachining cutting edges are distributed equidistantly over the circumference.

5. The machining tool according to claim 1, wherein the untwisted or nearly untwisted premachining cutting edges and postmachining cutting edges extend with a twist angle of −2° to 2°.

6. The machining tool according to claim 5, wherein the right-hand twisted cutting edges extend with a twist angle of 6° to 10°.

7. A method for repairing a damaged component of fiber-reinforced plastic, the method comprising:

adhesively bonding a patch with the damaged component in a damaged area of the damaged component, wherein the damaged area has a wall;

milling terraces into the damaged component along the wall;

said terraces opening towards the patch; and, said terraces being milled into the damaged component with a machining tool according to claim 1.

8. The machining tool according to claim 1, wherein the machining tool is an end milling cutter.

9. A method for cutting plates of fiber reinforced plastic with a thickness of less than 3 mm, the method comprising:

milling the plates of fiber reinforced plastic along a cutting line with an end milling cutter according to claim 8.

10. The machining tool according to claim 1, wherein the untwisted or nearly untwisted premachining cutting edges and postmachining cutting edges extend with a twist angle of 0°.

11. The machining tool according to claim 5, wherein the right-hand twisted cutting edges extend with a twist angle of 8°.

12. A method for repairing a damaged component of fiber-reinforced plastic, the method comprising:

adhesively bonding a patch with the damaged component in a damaged area of the damaged component, wherein the damaged area is a malfunctioning hole;

milling terraces with a height and a width of 0.1 mm to 0.5 mm into the damaged component around the damaged area;

said terraces opening towards the patch, and, said terraces being milled into the damaged component with a machining tool according to claim 1.

13. A method of cutting plates of fiber reinforced plastic with a thickness of less than 1.5 mm, the method comprising:

milling the plates of fiber reinforced plastic along a cutting line with an end milling cutter according to claim 8.

* * * * *